United States Patent
DeDe et al.

(10) Patent No.: US 9,188,065 B2
(45) Date of Patent: Nov. 17, 2015

(54) APU SELECTIVE COOL DOWN CYCLE

(75) Inventors: Brian C. DeDe, San Diego, CA (US); Stacey H. Light, San Diego, CA (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 935 days.

(21) Appl. No.: 13/197,178

(22) Filed: Aug. 3, 2011

(65) Prior Publication Data
US 2013/0031911 A1    Feb. 7, 2013

(51) Int. Cl.
*F02C 9/28* (2006.01)
*B64D 41/00* (2006.01)
*F02C 7/32* (2006.01)

(52) U.S. Cl.
CPC . *F02C 9/28* (2013.01); *B64D 41/00* (2013.01); *F02C 7/32* (2013.01); *F05D 2270/3032* (2013.01); *Y02T 50/672* (2013.01)

(58) Field of Classification Search
CPC ............. F05D 2220/50; F05D 2270/3032; F01D 25/12; F01D 21/12; B64D 41/00; F02C 7/32; F02C 9/28; Y02T 50/672
USPC .................................... 60/39.83, 772; 244/58
See application file for complete search history.

(56) References Cited

U.S. PATENT DOCUMENTS

| | | | |
|---|---|---|---|
| 4,936,748 A | 6/1990 | Adamson et al. | |
| 5,635,768 A | 6/1997 | Birch et al. | |
| 5,748,500 A * | 5/1998 | Quentin et al. | ............... 702/182 |
| 6,039,287 A | 3/2000 | Liston | |
| 6,122,975 A | 9/2000 | Sridhar et al. | |
| 6,625,504 B2 | 9/2003 | Landreth | |
| 6,735,951 B2 | 5/2004 | Thompson | |
| 6,833,206 B2 | 12/2004 | Erdle et al. | |
| 6,968,701 B2 | 11/2005 | Glahn et al. | |
| 7,093,447 B2 | 8/2006 | Thompson et al. | |
| 7,143,584 B2 * | 12/2006 | McKelvey et al. | ............... 60/778 |
| 7,168,254 B2 | 1/2007 | Riley | |
| 7,340,901 B2 * | 3/2008 | Riley | ............... 60/773 |
| 7,367,193 B1 | 5/2008 | Thompson | |
| 7,805,947 B2 | 10/2010 | Moulebhar | |
| 2008/0057848 A1 * | 3/2008 | Gray et al. | ............... 454/69 |
| 2008/0099611 A1 * | 5/2008 | Martino Gonzalez et al. | ............... 244/119 |

(Continued)

FOREIGN PATENT DOCUMENTS

| CA | 2703108 A1 | 5/2003 |
|---|---|---|
| CN | 101005987 A | 7/2007 |

(Continued)

OTHER PUBLICATIONS

Chinese Search Report for Chinese Patent Application No. 201210274848.4 completed on Apr. 24, 2014.

(Continued)

*Primary Examiner* — William H Rodriguez
*Assistant Examiner* — Carlos A Rivera
(74) *Attorney, Agent, or Firm* — Carlson, Gaskey & Olds, PC

(57) ABSTRACT

An APU has a control for controlling a load on the APU from an associated aircraft. The control further receives information with regard to a temperature challenge around the APU. If the temperature challenge exceeds a predetermined threshold, then the control operates the APU with a reduced load in a cool down cycle to reduce the heat load from the APU on an associated tail cone. A method is also disclosed.

12 Claims, 1 Drawing Sheet

(56) References Cited

U.S. PATENT DOCUMENTS

| | | | |
|---|---|---|---|
| 2008/0179947 A1* | 7/2008 | Suttie | 307/9.1 |
| 2008/0245051 A1* | 10/2008 | Skelton et al. | 60/39.83 |
| 2010/0185377 A1* | 7/2010 | Riley | 701/100 |
| 2010/0280733 A1* | 11/2010 | Jordan et al. | 701/100 |
| 2010/0293961 A1* | 11/2010 | Tong et al. | 60/778 |
| 2011/0214430 A1* | 9/2011 | Pauli et al. | 60/772 |
| 2012/0031520 A1* | 2/2012 | Kiran et al. | 138/151 |

FOREIGN PATENT DOCUMENTS

| | | |
|---|---|---|
| EP | 968918 A2 | 1/2000 |
| WO | 03/037715 A1 | 5/2003 |

OTHER PUBLICATIONS

European Search Report, mailed Nov. 30, 2012.

* cited by examiner

APU SELECTIVE COOL DOWN CYCLE

BACKGROUND

This application relates to an auxiliary power unit ("APU") which is put through a cool down cycle at shutdown, but only in an extreme temperature situation.

APUs are known, and are typically provided in an aircraft, and started prior to actuation of the main aircraft gas turbine engines. The APU provides electric power through a generator for use on the aircraft prior to the startup of the main gas turbine engines. In addition, the APU may supply air for use in the aircraft cabin, and to start the aircraft engines.

Once the main aircraft engines have started, then the APU may be shut down. The APUs typically are under a heavy load just prior to shutdown, in that they are supplying a good deal of electricity, plus air to start the main gas turbine engines. Thus, they can be quite hot at shutdown.

Aircraft tail cones typically house the APU. The aircraft tail cones have traditionally been made of a metal, however, more recently they have been formed of various fiber composite materials. As an example, carbon fiber materials are being utilized.

Such fiber materials cannot withstand the high temperatures that the prior metal tail cones could withstand. As an example, an aluminum tail cone can withstand 450° Fahrenheit (232° Celsius) while the composite tail cones may only withstand 200° Fahrenheit (93° Celsius).

SUMMARY

An APU has a control for controlling a load on the APU from an associated aircraft. The control further receives information with regard to a temperature challenge around the APU. If the temperature challenge exceeds a predetermined threshold, then the control operates the APU with a reduced load in a cool down cycle to reduce the heat load from the APU on an associated tail cone. A method is also disclosed.

These and other features of the present invention can be best understood from the following specification and drawings, of which the following is a brief description.

DETAILED DESCRIPTION OF THE INVENTION

Figure 1:
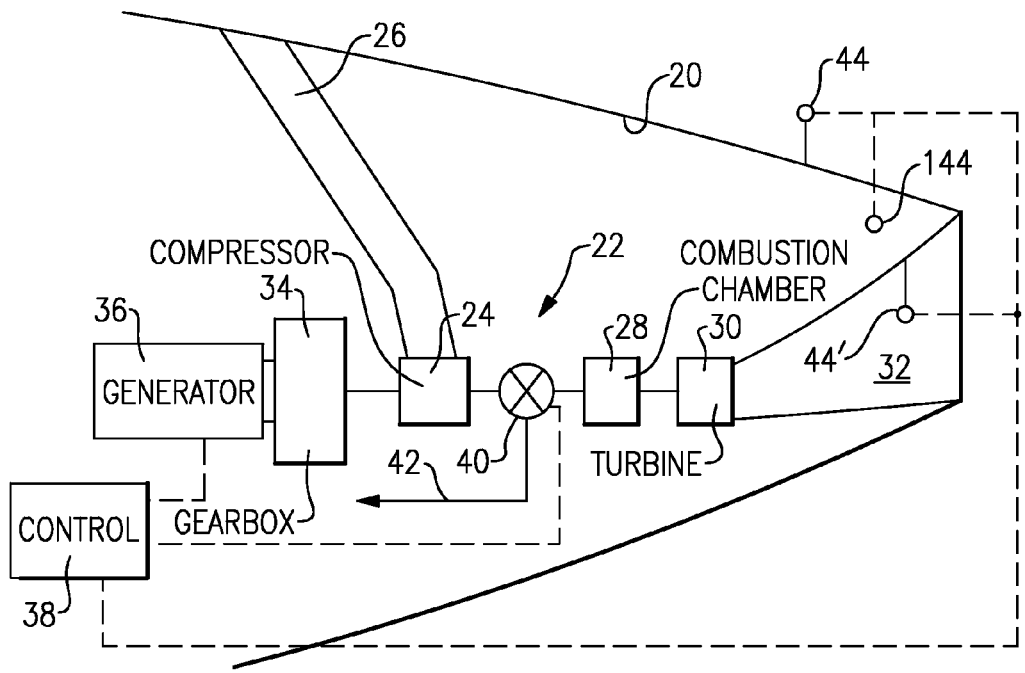
FIG. 1 schematically shows an aircraft tail cone and APU.

An APU 22 is shown mounted in a tail cone 20 of an aircraft. As mentioned above, the tail cone 20 may be formed of a composite material, such as a carbon fiber material. The APU 22 includes a compressor 24 drawing air from an air inlet 26. The air is compressed and passed through a combustion chamber 28, and then products of that combustion pass across a turbine 30 before existing through an exit nozzle 32.

The turbine 30 drives the compressor 24, and further drives a gearbox 34 which in turn drives a generator 36. The generator 36 provides electricity to a control 38 for use on the aircraft.

In addition, a diverter valve 40 may be positioned downstream of the compressor 24. As shown, a portion of the air 42 compressed by the compressor 24 can be delivered to the aircraft also. As shown, the control 38 may also control the valve 40 in one embodiment.

A temperature sensor 44 is shown schematically, and also communicates with the control 38. The temperature sensor 144 may sense an ambient temperature. The ambient temperature may be sensed outside 44 or inside 144 tail cone 20. Another sensor 44' may sense the temperature of the gas in the exhaust 32. Rather than these two temperatures, other variables indicative of a high heat load potentially being placed on the tail cone 20 could be sensed. Generally, these variables could be called a temperature challenge.

In one embodiment ambient temperature is utilized, and in another embodiment ambient temperatures plus the exhaust gas temperature are both utilized and compared to a predetermined threshold. If the threshold is exceeded, then the APU 22 is put through a cool down cycle at shutdown.

In a cool down cycle, the APU 22 continues to compress air, combust fuel and drive the turbine 30, and hence the compressor 24 before shutdown. However, the load on the APU 22 is reduced. As an example, the diverter valve 40 is actuated such that all of the air is directed into the combustion chamber 28. In addition, the tapping of electricity from the generator 36 may be reduced, or stopped. In addition, if there is a clutch provided between the output shaft and a gear box, that clutch can be opened during a cool down mode.

Both of these steps can be taken, since the time for the APU 22 to be shut down is typically associated with the main gas turbine engines on the aircraft being operational, and thus able to supply electricity and air on their own.

The APU 22 is run in the cool down mode for a period of time sufficient to reduce the heat mass of the APU 22, such that the APU 22 can finish cooling down without damage to the tail cone 20.

A cool down cycle could potentially harm the turbine 30. However, it is not used in every instance of shutting down the APU 22, and thus the damage to the turbine 30 should be minimized.

Figure 2:
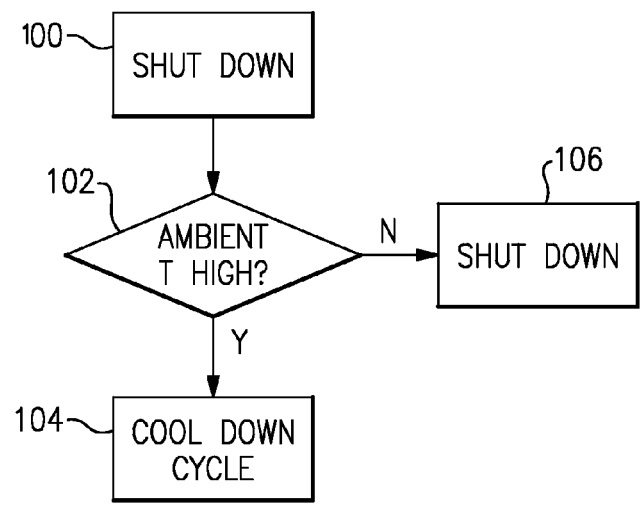
FIG. 2 is a flow chart.

Instead, as shown in FIG. 2, once a shutdown decision 100 is reached, the temperature challenge is identified. The temperature challenge is compared to the same threshold 102. If the temperature challenge (ambient and/or exhaust gas temperatures or some other variable, for example) is indicative of a potential of heat damage to the tail cone, then the cool down cycle is run 104. If it is not, the APU is simply shut down 106. The cool down cycle can operate for a number of minutes, for example less than ten minutes and on the order of about five minutes. The method depicted in FIG. 2 can be executed by control 38 of FIG. 1. Selectively running the cool down cycle can lower thermal loads on the tail cone 20 and allow for the use of composite materials in the tail cone 20 without adding the weight and expense of thermal insulation blankets which may otherwise be needed to limit tail cone temperature.

Although embodiments of this invention have been disclosed, a worker of ordinary skill would recognize that certain modifications would come within the scope of this invention. For that reason, the following claims should be studied to determine the true scope and content of this invention.

What is claimed is:

1. An auxiliary power unit (APU) comprising:
   a compressor for compressing air and delivering compressed air into a combustion chamber, the air being mixed with fuel and combusted in the combustion chamber, and passed over a turbine, said turbine driving a generator to generate electricity;
   a control for controlling a load on the APU from an associated aircraft, said control receiving a shut down signal indicative of a shut-down of the APU, said control further receiving information with regard to a temperature challenge around the APU, and if the temperature challenge exceeds a predetermined threshold, then said control operating said APU with the load reduced in a cool down cycle to reduce a heat load from the APU on a tail cone of the associated aircraft prior to shut down of the APU;

a sensor for sensing the temperature challenge and sending the information, the temperature challenge being, indicative of a potential of heat damaged to the tail cone, with the tail cone being formed of carbon fiber;

said sensor being inside of said tail cone, and outside of said APU.

2. The APU as set forth in claim 1, wherein said reduced load includes reducing an amount of electricity tapped from the generator to the associated aircraft.

3. The APU as set forth in claim 2, wherein a valve controls a flow of air from the compressor to the combustion chamber, and also serves to pass some of the air from the compressor to the associated aircraft, said valve being actuated to reduce the flow of air to the aircraft to reduce the heat load in the cool down cycle.

4. The APU as set forth in claim 1, wherein the sensed temperature is an ambient temperature.

5. The APU as set forth in claim 1, wherein the sensed temperature includes an exhaust gas temperature downstream of the turbine.

6. The APU as set forth in claim 1, wherein said control shutting down the APU without a cool down cycle if the temperature challenge does not exceed the predetermined threshold.

7. A method of selectively cooling an auxiliary power unit (APU) of an aircraft including the steps of:

operating the APU, and identifying a shutdown decision;

sensing a temperature challenge of a tail cone of the aircraft associated with the APU, comparing the temperature challenge to a predetermined threshold;

operating the APU in a cool down cycle prior to shut down if the temperature challenge exceeds the predetermined threshold, and not operating the APU in the cool down cycle prior to shut down if the temperature challenge does not exceed the predetermined threshold;

sensing the temperature challenge with a sensor located inside of the tail cone, but outside the APU;

the temperature challenge being indicative of a potential of heat damaged to the associated tail cone being formed of carbon fiber.

8. The method as set forth in claim 7, wherein the temperature challenge is evaluated based upon an ambient temperature.

9. The method as set forth in claim 8, wherein the temperature challenge is also evaluated based upon an exhaust gas temperature.

10. The method as set forth in claim 7, wherein the cool down cycle reduces a heat load on the APU from an associated aircraft.

11. The method as set forth in claim 10, wherein a supply of electricity from a generator associated with the APU to the associated aircraft is reduced in the cool down cycle to reduce the heat load.

12. The method as set forth in claim 10, wherein a volume of air diverted from a compressor associated with the APU to the associated aircraft is reduced in the cool down cycle to reduce the heat load.

* * * * *